US006927251B2

(12) United States Patent
Rische et al.

(10) Patent No.: US 6,927,251 B2
(45) Date of Patent: Aug. 9, 2005

(54) MIXTURES OF AQUEOUS BINDERS

(75) Inventors: Thorsten Rische, Unna (DE);
Detlef-Ingo Schütze, Odenthal (DE);
Jürgen Meixner, Krefeld (DE);
Tillmann Hassel, Pulheim (DE);
Roland Komorek, Leverkusen (DE);
Lutz Schmalstieg, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 152 days.

(21) Appl. No.: 10/276,893

(22) PCT Filed: May 9, 2001

(86) PCT No.: PCT/EP01/05243

§ 371 (c)(1),
(2), (4) Date: Nov. 19, 2002

(87) PCT Pub. No.: WO01/90229

PCT Pub. Date: Nov. 29, 2001

(65) Prior Publication Data

US 2003/0158322 A1 Aug. 21, 2003

(30) Foreign Application Priority Data

May 22, 2000 (DE) .......................................... 100 25 304

(51) Int. Cl.$^7$ .............................. C08J 3/00; C08K 3/20; C08K 3/34; C08L 75/00
(52) U.S. Cl. ...................... 524/591; 524/492; 524/493; 524/839; 524/840
(58) Field of Search ................................ 524/591, 839, 524/840, 492, 493

(56) References Cited

U.S. PATENT DOCUMENTS

| 3,687,715 A | 8/1972 | Kigane et al. ............ 117/76 R |
| 3,705,164 A | 12/1972 | Honig et al. ......... 260/29.6 NR |
| 3,996,223 A | 12/1976 | Gupta et al. .......... 260/245 NS |
| 4,255,569 A | 3/1981 | Muller et al. ................ 544/193 |
| 4,644,030 A | 2/1987 | Loewrigkeit et al. ....... 524/457 |
| 4,730,021 A | 3/1988 | Zom et al. ................... 524/457 |
| 4,755,425 A | 7/1988 | Huang ......................... 428/331 |
| 4,837,359 A | 6/1989 | Woynar et al. ............. 560/335 |
| 4,960,848 A | 10/1990 | Scholl et al. ................. 528/48 |
| 4,994,541 A | 2/1991 | Dell et al. ..................... 528/51 |
| 5,041,494 A | 8/1991 | Franke et al. ............... 524/588 |
| 5,064,960 A | 11/1991 | Pedain et al. ............... 544/222 |
| 5,076,958 A | 12/1991 | Pedain et al. ............. 252/182.2 |
| 5,137,961 A | 8/1992 | Goos et al. .................. 524/457 |
| 5,354,808 A | 10/1994 | Onwumere et al. ......... 524/837 |
| 5,554,686 A | 9/1996 | Frisch, Jr. et al. .......... 524/588 |
| 5,684,081 A | 11/1997 | Dannhorn et al. .......... 524/507 |
| 5,716,676 A | 2/1998 | Schutze et al. .......... 427/385.5 |
| 5,747,582 A | 5/1998 | Schutze et al. ............. 524/591 |
| 5,859,118 A | 1/1999 | Roesler et al. .............. 524/493 |
| 5,919,860 A | 7/1999 | Roesler et al. .............. 524/838 |
| 5,932,652 A | 8/1999 | Roesler et al. .............. 524/839 |
| 5,945,476 A | 8/1999 | Roesler et al. .............. 524/588 |
| 5,952,445 A | 9/1999 | Roesler et al. ................ 528/28 |
| 5,969,019 A | * 10/1999 | Kanai et al. ................. 524/140 |
| 6,022,919 A | 2/2000 | Komoto et al. ............. 524/430 |

FOREIGN PATENT DOCUMENTS

| DE | 1 670 666 | 7/1971 |
| EP | 372 957 | 6/1990 |
| EP | 0 798 229 | 10/1997 |
| EP | 0 924 232 | 6/1999 |
| GB | 1 244 416 | 9/1971 |

* cited by examiner

Primary Examiner—Patrick D. Niland
(74) Attorney, Agent, or Firm—Joseph C. Gil

(57) ABSTRACT

The present invention relates to aqueous silica sol-modified PU dispersions and their use as coating materials, in particular [lacuna] textiles and leather.

9 Claims, No Drawings

US 6,927,251 B2

MIXTURES OF AQUEOUS BINDERS

FIELD OF THE INVENTION

The invention relates to silica sol-modified aqueous polyurethane-polyurea dispersions and their use as coating materials having improved resistance to chemicals and water vapor permeability and improved mechanical properties, in particular for the textile sector and leather sector.

BACKGROUND OF THE INVENTION

Aqueous systems are increasingly being used in the coating of textiles and leather. Requirements such coating systems have to meet are in particular high resistances to chemicals and water, high mechanical stability and high tensile strength and ultimate tensile strength and adhesion. These requirements are substantially met by polyurethane dispersions. The various possibilities for the preparation of such dispersions was summarized, for example, by D. Dieterich in a review article [D. Dieterich, Prog. Org Coatings 9, 281 (1981)].

As [lacuna] in U.S. Pat. No. 5,041,494, U.S. Pat. No. 5,354,808 and U.S. Pat. No. 5,554,686 and in EP-A 0 924231 and EP-A 0 924230, the chemical and mechanical stability of coatings of polyurethane-polyurea dispersions, referred to below as PU dispersions, can be improved if the PU dispersions are modified with alkoxysilane groups.

A further improvement of the resistance to chemicals and hardness of alkoxysilane-modified PU dispersions is achieved in combination with silica sols and is described in detail in U.S. Pat. No. 5,945,476, U.S. Pat. No. 5,952,445, U.S. Pat. No. 5,859,118, U.S. Pat. No. 5,932,652 and EP-A 0 924 232.

However, those combinations of alkoxysilane-modified PU dispersions and silica sols which are known to date from the prior art have the disadvantage that the preparation of the alkoxysilane-modified PU dispersions is very much more complicated compared with conventional polyurethane dispersions. Furthermore, the silanes required for the preparation of the alkoxysilane-modified PU dispersions are comparatively difficult to obtain and are very expensive, with the result that commercial use is restricted to special areas.

It was therefore the object of the present invention to provide alternative PU dispersions for the area of textile and leather coating which, on the one hand, have the advantages of the silane-modified products, namely the improved resistances to chemicals in comparison with conventional PU dispersions in combination with good swelling behavior in water and improved mechanical properties and in the preparation of which, on the other hand, it is possible to dispense with expensive process steps involving starting compounds, such as alkoxysilanes, which are difficult to obtain.

Surprisingly, it was found that PU dispersions which do not have alkoxysilane groups, in combination with silica sols, also correspond to the property profile described above. In addition, it was found that these dispersions have, inter alia, substantially improved water vapor impermeability in comparison with conventional PU dispersions and their gloss levels do not change. Moreover, the dispersions according to the invention are more readily obtainable than the water vapor permeable PU coating materials disclosed in the prior art (DE 4 236 569A1) and have better water vapor permeability in combination with equally good swelling behavior.

SUMMARY OF THE INVENTION

The invention therefore relates to binder compositions characterized in that they consist of a combination of 40–95%, preferably 50–90% and particularly preferably 60–85% of a PU dispersion (A)

and

5–60%, preferably 10–50% and particularly preferably 15–40% of a silica sol dispersion (B), the stated percentages being based on the weight of nonvolatile fractions and summing to 100% by weight.

The invention furthermore relates to the use of the described coating materials as binders for textiles and leather.

In principle, all PU dispersions of the prior art which are not alkoxysilane-modified are suitable. The PU dispersions (A) according to the invention are generally composed of:

A1. polyisocyanates,

A2. polymeric polyols having average molecular weights of 400 to 6,000,

A3. optionally monoalcohols or monoamines,

A4. polyols, aminopolyols or polyamines having a molecular weight of less than 400, one or more of the compounds (A3) and/or (A4) containing an ionic group or being capable of forming an ionic group. These ionic groups may be cationic or, preferably, anionic. The incorporation of compounds of this class of products, having, for example, free carboxyl groups, into the polyurethane means that these groups can be converted into ionic groups by neutralization, i.e. they are capable of forming an ionic group, and A5. polyoxyalkylene ethers having at least one hydroxyl or amino group.

DETAILED DESCRIPTION OF THE INVENTION

Suitable diisocyanates (A1) are in principle those of the molecular weight range from 140 to 400, having aliphatically, cycloaliphatically, araliphatically and/or aromatically bonded isocyanate groups, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)-isocyanatomethylcyclohexane, bis(isocyanatomethyl)norbornane, 1,3- and 1,4-bis-(2-isocyanato-prop-2-yl)-benzene (TMDXI), 2,4- and 2,6-diisocyanatotoluene (TDI), 2,4' and 4,4'-diisocyanatodiphenylmethane, 1,5-diisocyanatonaphthalene or any desired mixtures of such diisocyanates.

They are preferably polyisocyanates or polyisocyanate mixtures of said type having exclusively aliphatically and/or cycloaliphatically bonded isocyanate groups. Very particularly preferred starting components (A1) are polyisocyanates or polyisocyanate mixtures based on HDI, IPDI and/or 4,4'-diisocyanatodicyclohexyl-methane.

Other suitable polyisocyanates (A1) are any desired polyisocyanates prepared by modifying simple aliphatic, cycloaliphatic, araliphatic and/or aromatic diisocyanates, composed of at least two diisocyanates and having a uretdione, isocyanurate, urethane, allophanate, biuret, iminooxadiazinedione and/or oxadiazinetrione structure, as described by way of example in J. Prakt. Chem. 336 (1994) 185–200, DE-A-1 670 666, DE-A-1 954 093, DE-A-2 414

413, DE-A-2 452 532, DE-A-2 641 380, DE-A-3 700 209, DE-A-3 900 053 and DE-A-3 928 503 or EP-A-0 336 205, EP-A-0 339 396 and EP-A-0 798 229.

The polymeric polyols (A2) in the molecular weight range of 400–6 000 are the customary ones as already long used for polyurethanes, having an OH functionality of at least 1.8 to about 4, such as, for example, polyacrylates, polyesters, polylactones, polyethers, polycarbonates, polyestercarbonates, polyacetals, polyolefins and polysiloxanes. Polyols in a molecular weight range from 600 to 2 500 and having an OH functionality of 2 to 3 are preferably used.

In addition to the use of difunctional OH components, the termination of the polyurethane prepolymer with a monofunctional alcohol (A3) is also suitable, as known from the literature. Suitable monoalcohols (A3) are preferably aliphatic monoalcohols having 1–18 C atoms, such as, for example, ethanol, n-butanol, ethylene glycol monobutyl ether, 2-ethylhexanol, 1-octanol, 1-dodecanol or 1-hexadecanol.

Polyols, aminopolyols or polyamines having a molecular weight of less than 400 (A4), which can be used as chain extenders in polyurethanes or polyurethane dispersions, are likewise described in large numbers in the corresponding literature. The following may be mentioned as examples: ethanediol, 1,4-butanediol, cyclohexanedimethanol, trimethylolpropane, glycerol and hydrazine, ethylenediamine, 1,4-diaminobutane, isophoronediamine, diethylenetriamine and 4,4-diaminodicyclohexylmethane.

Furthermore, the polyurethane dispersions according to the invention may contain hydrophilic polyoxyalkylene ethers (A5) having at least one hydroxyl or amino group. These polyethers have a high content (about 30% by weight to 100% by weight) of building blocks which are derived from ethylene oxide. Linear polyethers having a functionality between 1 and 3, but also compounds of the general formula I

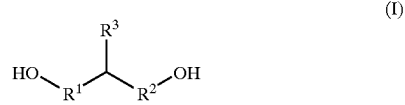

(I)

in which $R^1$ and $R^2$, independently of one another, each denote a divalent aliphatic, cycloaliphatic or aromatic radical having 1 to 18 C atoms, which may be interrupted by oxygen and/or nitrogen atoms, and $R^3$ represents a non-hydroxyl-terminated polyester or, preferably, polyether, are suitable. $R^3$ particularly preferably represents an alkoxy-terminated polyethylene oxide radical.

The hydroxyl components (A2), (A3) and (A4) may contain double bonds which may originate, for example, from long-chain aliphatic carboxylic acids or fatty alcohols. Functionalization with olefin double bonds is possible, for example, by incorporating allylic groups or acrylic acid or methacrylic acid and the respective esters thereof.

Components (A3) and (A4) which contain an ionic group or are capable of forming an ionic group are, for example, dimethylolpropionic acid, hydroxypivalic acid, the sodium salt of 2-(2-amino-ethylamino)-ethanesulfonic acid, polyethersulfonate, the propoxylated adduct of 2-butenediol and NaHSO$_3$ and building blocks, such as N-methyl-diethanolamine, which can be converted into cationic groups. Those components (A3) and (A4) which have carboxyl or carboxylate and/or sulfonate groups are preferably used.

The preparation of the aqueous polyurethane dispersions (A) is effected in the known customary manner: the polyisocyanate component is allowed to react completely with polymeric polyol and low molecular weight chain extenders to give a polyurethane, a solvent which can subsequently optionally be separated off again optionally and advantageously being concomitantly used. Suitable solvents are the customary coating solvents known per se, such as, for example, ethyl acetate, butyl acetate, 1-methoxyprop-2-yl acetate, 3-methoxy-n-butyl acetate, acetone, 2-butanone, 4-methyl-2-pentanone, cyclohexanone, toluene, xylene, chlorobenzene, mineral spirit, mixtures which contain in particular relatively highly substituted aromatics, as are commercially available, for example, under the names Solvent Naphtha, Solvesso® (Exxon), Cypar® (Shell), Cyclo Sol® (Shell), Tolu Sol® (Shell), Shellsol® (Shell), carbonic esters, such as dimethyl carbonate, diethyl carbonate, 1,2-ethylene carbonate and 1,2-propylene carbonate, lactones, such as β-propiolactone, γ-butyrolactone, ε-caprolactone, ε-methylcaprolactone, propylene glycol diacetate, diethylene glycol dimethyl ether, dipropylene glycol dimethyl ether, diethylene glycol ethyl- and -butyl ether acetate, N-methylpyrrolidone and N-methyl-caprolactam, or any desired mixtures of said solvents.

In a further step, groups capable of being neutralized are then converted into the salt form and the dispersion is produced with water. Depending on the degree of neutralization and content of ionic groups, the dispersion may be made very finely divided so that it virtually has the appearance of a solution, but very coarse-particled formulations which are also sufficiently stable are also possible. However, small mean particle sizes of <300 nm or high contents of hydrophilic groups are advantageous since this improves the emulsification of the polyisocyanate and hence the quality of the coating film. The solids content can also be varied within wide limits of, for example, 20–60%.

The silica sol-modified PU dispersions according to the invention preferably have a solids content of 20–60% and particularly preferably of 30–50% in the polyurethane part (A).

The silica sol-modified PU dispersions according to the invention are preferably composed of PU dispersions (A) which have been prepared by the acetone process known from the literature.

Excess isocyanate groups are then caused to react by reaction with polyfunctional isocyanate-reactive compounds (chain extension). Preferably water or the polyamines already mentioned under (A4), particularly preferably di- and triamines, hydrazine and the sodium salt of 2-(2-amino-ethylamino)-ethanesulfonic acid, are used for this purpose. Termination with a monoamine, such as, for example, diethylamine, dibutylamine, ethanolamine, N-methylethanolamine or N,N-diethanolamine, is also possible.

It is furthermore possible to modify the silica sol-modified polyurethane dispersions according to the invention by polyacrylates. For this purpose, an emulsion polymerization of olefinically unsaturated monomers, for example esters of (meth)acrylic acid and alcohols having 1–18 C atoms, styrene, vinyl esters or butadiene, is carried out in the presence of the polyurethane dispersion, as described, for example, in DE-A-1 953 348, EP-A-0 167 188, EP-A-0 189 945 and EP-A-0 308 115. The monomers contain one or more olefinic double bonds. In addition, the monomers may contain functional groups, such as hydroxyl, epoxy, methylol or acetoacetoxy groups. The emulsion polymerization can be effected before or after the modification with silica sols.

For use, the polyurethane dispersions according to the invention are employed either alone or in combination with other aqueous binders. Such aqueous binders may be composed, for example, of polyester, polyacrylate, polyepoxide or polyurethane polymers. Combination with radiation-curable binders, as described, for example, in EP-A-0 753 531, is also possible.

Silica Sols (B):

Silica sols according to the invention are colloidal solutions of amorphous silicon dioxide in water. They are obtained by neutralizing waterglass, as described, for example, in Ullmanns Encyklopädie der technischen Chemie (Vol. 21, 4th edition, Verlag Chemie, Weinheim, 1982, Chapter 5, page 456 et seq.). Silica sols are commercially available, for example, under the trade names Levasil® (Bayer AG), Ludox® (DuPont), Nalcoag® (Nalco), Snowtex® (Nissan). The $SiO_2$ particles have diameters of 1–150 nm. Silica sols whose $SiO_2$ particles have a diameter between 5 and 100 nm are preferably used in the dispersions according to the invention. Silica sols having a mean $SiO_2$ particle diameter of 7 to 50 nm are particularly preferably used. Silica sols may be both basic (pH>7) and acidic (pH<7). The solids content of silica sols is usually 1–60%, preferably 20–40% and particularly preferably 25–35%. In the case of nonionically and/or ionically hydrophilized PU dispersions, the use of basic silica sol types is preferred.

Coating materials according to the invention can be prepared by mixing a PU dispersion (A) and a silica sol (B) by all known mixing techniques.

The silica-modified PU dispersions according to the invention contain an amount of 40–95% of a PU dispersion (A) and an amount of 5–60% of a silica sol dispersion (B), the stated percentages being based on the weight of nonvolatile fractions and summing to 100% by weight.

In a particularly preferred embodiment [lacuna] an amount of 50–90% of a PU dispersion (A) and an amount of 10–50% of a silica sol dispersion (B), the stated percentages being based on the weight of nonvolatile fractions and summing to 100% by weight.

Particularly preferably, the dispersions according to the invention contain an amount of 60–85% of a PU dispersion (A) and an amount of 15–40% of a silica sol dispersion (B), the stated percentages being based on the weight of nonvolatile fractions and summing to 100% by weight.

A particularly preferred process for the preparation of the dispersions according to the invention is the possibility of introducing the silica sols during the preparation of the PU dispersion. For this purpose, the prepolymer synthesized by one of the known preparation methods is dispersed in silica sol or a silica sol/water mixture instead of pure water. A reduction in the process costs by the subsequent mixing step and the plant costs by the proportion of a mixing apparatus is thus possible.

It is furthermore possible to add crosslinking agent before application. Hydrophilic or hydrophilized polyisocyanate crosslinking agents are suitable for this purpose.

The silica sol-modified PU dispersions according to the invention are used as binders in coatings and adhesives. Coatings based on PU dispersions according to the invention can be used, for example, on metal, plastic, paper, leather, textile, felt, wood, glass, glass fibers and mineral substrates. A particularly preferred use is the coating of textiles and leather.

The silica sol-modified PU dispersions can be used as such or in combination with the auxiliaries and additives known from coating technology, such as, for example, nonionic and/or anionic thickeners, fillers, pigments, waxes, handle compositions, dyes, solvents and leveling agents for the production of coatings.

The application of the coating materials can be effected in a known manner, for example by brushing, casting, knife-coating, spraying, roll-coating or dipping. The drying of the coating film can be effected at room temperature or elevated temperature, but also by baking at up to 200° C.

The dispersions according to the invention are suitable in particular for coating or for covering and for impregnating woven and nonwoven textiles.

The dispersions according to the invention serve for the production of substrates, in particular leather and textile, provided with a water vapor permeable coating.

Suitable substrates are preferably flexible materials, in particular textile and leather.

The dispersions to be used according to the invention are storable and shippable and can be processed at any time later on. Depending on the chosen chemical composition of the polyurethane and on the content of silica sol, coatings having different properties are obtained. Thus, soft tacky coats, thermoplastic and elastomeric products of various degrees of hardness up to glass-hard thermosetting plastics can be obtained.

The dispersions to be used according to the invention are as a rule applied to the substrate without further additives. This can be effected by direct spreading onto the substrate with the aid of knife coaters, rolls or doctor blades.

As a rule, a plurality of coats are applied in succession, but preferably two, so that the total thickness of the coating comprising base and top coat(s) is 10 to 100 $\mu$m, preferably 20 to 60 $\mu$m. A paste drying to a microporous coat, as described in DE-A 2 020 153, may also be used as the base coat. The subsequently applied top coat protects the total system from mechanical stress and abrasion.

The application of the coating system comprising base and top coat is, however, also possible by the so-called reverse method. Here, first the top coat is applied to a release support and dried. After application of a second base or adhesion-promoting coat, the substrate is pressed gently into the still moist coat. After drying, a firm system comprising coating and substrate forms, which is detached from the release support and corresponds in its structure substantially to that of the direct coating described above.

EXAMPLES

Substances Used:
A. Impranil® DLN (Bayer AG): 40% strength anionic aliphatic polyesterpolyurethane dispersion having the following properties (DIN 53504): 100% modulus: 2 MPa; tensile strength: 20 MPa; elongation at break: 700%.
B. Impranil® DLN-SD (Bayer AG): 40% strength anionic aliphatic polyesterpolyurethane dispersion having the following properties (DIN 53504): 100% modulus: 2 MPa; tensile strength: 20 MPa; elongation at break: 700%.
C. Impranil® DLP (Bayer AG): 50% strength anionic aliphatic polyesterpolyurethane dispersion having the following properties (DIN 53504): 100% modulus: 1.3 MPa; tensile strength: 15 MPa; elongation at break: 650%.
D. Impranil® DLV (Bayer AG): 40% strength anionic aliphatic polyesterpolyetherpolyurethane dispersion having the following properties (DIN 53504): 100% modulus: 2.5 MPa; tensile strength: 20 MPa; elongation at break: 500%.
E. Levasil® 100/30 (Bayer AG): 30% strength anionic silica sol dispersion having the following properties: specific surface area: 100 $m^2/g$; mean particle size: 30 nm; pH=10.
F. Levasil® 200/30 (Bayer AG): 30% strength anionic. silica sol dispersion having the following properties: specific surface area: 200 $m^2/g$; mean particle size: 15 nm; pH=9.
G. Levasil® 300/30 (Bayer AG): 30% strength anionic silica sol dispersion having the following properties: specific surface area: 300 $m^2/g$; mean particle size: 9 nm; pH=10.

H. Levasil® VP AC 4038 (Bayer AG): 30% strength anionic silica sol dispersion having the following properties: specific surface area: 200 m$^2$/g; mean particle size: 15 nm; pH=9.
I. Bayderm® bottom APV (Bayer AG): 20% aromatic, anionic, flexible polyether-polyurethane dispersion having the following properties: 100% modulus: 0.4 MPa; tensile strength: 5.7 MPa at 1 150% elongation.
J. Euderm® base black D-C (Bayer AG): formulation containing 26% of carbon black, 0.2% of a sheet silicate and 8.6% of a polyacrylic acid neutralized with ethanolamine.
K. Euderm® filler VF01 (Bayer AG): leveling agent, containing 2.5% of a sheet silicate, 1.5% of a nonfunctional silicone and 1.5% of neatsfoot oil and 3.3% of casein. The formulation is rendered alkaline with ammonia.
L. Bayderm® Soft Q (Bayer AG): antiadhesive emulsion, containing 5% of wool fat, 20% of associative polyurethane thickener and 1% of high-boiling aromatic blend.
M. Primal® Dispersion 32 A (Rohm and Haas): 35% strength, having the following properties: 100% modulus 0.3 MPa, tensile strength 4.0 MPa at 880% elongation.
N. Bayderm® bottom 50 DU (Bayer AG): medium hardness, 40% strength aliphatic-aromatic polyester-polyurethane dispersion having the following properties: 100% modulus 4.7 MPa; tensile strength 33 MPa at 600% elongation.
O. Euderm® matt finish SN (Bayer AG): commercial drying matting agent; containing 19% of a precipitated silica having a mean particle size of 4.3 µm.
P. Crosslinking agent: 50% strength solution consisting of Desmodur N 3100 in propylene glycol diacetate; NCO content 8.6%, NCO functionality 2.8.
Q. Bayderm® Finish DLF (Bayer AG): very hard (Shore A>90) 40% strength aliphatic polyester-PU dispersion for finishes having the following film data: 100% modulus 17.5 MPa; tensile strength 42.1 MPa at 560% elongation.
R. Binder according to the following preparation method: 500 g of hexamethylene diisocyanate (HDI) and 1.25 g of dibutyl phosphate are initially introduced into a 2 l flask. 615 g of trimethylolpropane-initiated ethylene oxide (EO)/propylene oxide (PO) copolyether (62.5% by weight of PO; 17.5% by weight of EO, the ethylene oxide content being present as the terminal block; characteristic data: Mn: 4 800; OH number: 35; F: 3) are added while stirring. Heating is carried out to an internal temperature of 100° C. and stirring is effected at this temperature for 30 min.

The batch is cooled to 80° C. 500 g of a propylene glycol-initiated ethylene oxide/propylene oxide copolyether (50% by weight of PO; 50% by weight of EO, 19% of the EO fraction being present as a terminal block; characteristic data: Mn: 2 000, OH number: 56, F: 3) are added, the temperature increasing again to 100° C. Stirring is effected at 100° C. until the NCO content has decreased to 13%. After the addition of a further 0.6 g of dibutyl phosphate, the product is subjected to a thin-film distillation at 50 mbar and 160° C. in order to separate off excess HDI.

A low-viscosity resin having an NCO content of 3.06% (precursor) results. 16 g of an isocyanate (mixture of isocyanurate/uretdione of hexamethylene diisocyanate, comprising 15% of uretdione; NCO content 22%) are stirred into 250 g of this resin.

The resulting product has an NCO content of 4.2%, a viscosity of 2 400 mPa s (22° C.) and an equivalent weight of 1 000 g per equivalent of NCO.
S. Curing agent: Formulation of isophoronediamine in butanone, containing 2.17% of water; 600 g of curing agent corresponds to 1 equivalent of NH$_2$.

Preparation Examples

1.) Silica Sol-Modified PU Dispersion (PU 1)
337.5 g of PU dispersion A are initially introduced into a reaction vessel having a stirrer, dropping funnel and reflux condenser, and 112.5 g of silica sol dispersion E are added dropwise in the course of 10 min while stirring. Stirring is then effected for a further 30 min at room temperature.

2.) Silica Sol-Modified PU Dispersion (PU 2)
Procedure analogous to 1.) but 300.0 g of PU dispersion A and 150.0 g of silica sol dispersion E.

3.) Silica Sol-Modified PU Dispersion (PU 3)
Procedure analogous to 1.) but 225 g of PU dispersion A and 225 g of silica sol dispersion E.

4a.) Silica Sol-Modifies PU Dispersion (PU 4a)
Procedure analogous to 1.) but 360.0 g of PU dispersion B and 90.0 g of silica sol dispersion E.

4b.) Silica Sol-Modified PU Dispersion (PU 4b)
Procedure analogous to 1.) but 360.0 g of PU dispersion A and 90.0 g of silica sol dispersion E.

5.) Silica Sol-Modifies PU Dispersion (PU 5)
Procedure analogous to 1.) but 360.0 g of PU dispersion B and 90.0 g of silica sol dispersion F.

6.) Silica Sol-Modifies PU Dispersion (PU 6)
Procedure analogous to 1.) but 360.0 g of PU dispersion B and 90.0 g of silica sol dispersion G.

7.) Silica Sol-Modifies PU Dispersion (PU 7)
Procedure analogous to 1.) but 360.0 g of PU dispersion B and 90.0 g of silica sol dispersion H.

8.) Silica Sol-Modifies PU Dispersion (PU 8)
360.0 g of PU dispersion C and 171.8 g of distilled water are initially introduced into a reaction vessel having a stirrer, dropping funnel and reflux condenser, and 90.0 g of silica sol dispersion E are added dropwise in the course of 10 min while stirring. Stirring is then effected for a further 30 min at room temperature.

9.) Silica Sol-Modifies PU Dispersion (PU 9)
Procedure analogous to 8.) but 337.5 g of PU dispersion C, 161.0 g of distilled water and 112.5 g of silica sol dispersion E.

10.) Silica Sol-Modifies PU Dispersion (PU 10)
Procedure analogous to 8.) but 300.0 g of PU dispersion C, 143.1 g of distilled water and 150.0 g of silica sol dispersion E.

11.) Silica Sol-Modifies PU Dispersion (PU 11)
Procedure analogous to 1.) but 225.0 g of PU dispersion C, 107.4 g of distilled water and 225.0 g of silica sol dispersion E.

12.) Silica Sol-Modifies PU Dispersion (PU 12)
Procedure analogous to 1.) but 666.6 g of PU dispersion D, 114.2 g of distilled water and 133.4 g of silica sol dispersion G.

13.) Silica Sol-Modifies PU Dispersion (PU 13)
Procedure analogous to 8.) but 640.0 g of PU dispersion D, 109.7 g of distilled water and 160.0 g of silica sol dispersion G.

14.) Silica Sol-Modifies PU Dispersion (PU 14)
Procedure analogous to 8.) but 600.0 g of PU dispersion D, 102.9 g of distilled water and 200.0 g of silica sol dispersion G.

15.) Silica Sol-Modifies PU Dispersion (PU 15)
Procedure analogous to 8.) but 533.4 g of PU dispersion D, 91.4 g of distilled water and 266.6 g of silica sol dispersion G.

16.) Silica Sol-Modified PU dispersion (PU 16)
Procedure analogous to 8.) but 400.0 g of PU dispersion D, 68.6 g of distilled water and 400.0 g of silica sol dispersion G.

17.) Silica Sol-Modified PU dispersion (PU 17)

Procedure analogous to 8.) but 640.0 g of PU dispersion D, 109.7 g of distilled water and 160.0 g of silica sol dispersion H.

Application Section

Textile:

The properties of PU dispersions for textile coating are determined for free films which are produced as follows:

In a film-drawing apparatus consisting of two polished rolls which can be adjusted to an exact spacing, a release paper is inserted before the rear roll. The distance between paper and front roll is adjusted by means of a feeler gage. This distance corresponds to the (wet) film thickness of the resulting coating and can be adjusted to the desired thickness of each coat. Coating is also possible consecutively in a plurality of coats. For application of the individual coats, the products (aqueous formulations are brought to a viscosity of 4 500 mPa s beforehand by adding ammonia/polyacrylic acid) are poured onto the gap between paper and front roll and the release paper is drawn perpendicularly downward, the corresponding film forming on the paper. If it is intended to apply a plurality of coats, each individual coat is dried and the paper inserted again.

The modulus of elasticity was determined according to DIN 53504 for films having a thickness>100 μm.

The mean particle sizes (the number average is stated) of the PU dispersions were determined by means of laser correlation spectroscopy (apparatus: Malvern Zetasizer 1000, Malvern Inst. Limited).

The ethyl acetate swelling was calculated after storage for 2 hours in ethyl acetate by measuring the difference of length and width.

The water vapor permeabilities (WVP) are measured according to the specifications set out in the publication DS 2109 TM1 of the British Textile Technology Group, Manchester, England.

TABLE 1

Polyurethane A/silica sol E mixtures having different silica sol contents

|  | PU A | PU 1 | PU 2 | PU 3 |
|---|---|---|---|---|
| Solids content [% by weight] | 41.4 | 39.2 | 39.2 | 39.0 |
| pH | 6.9 | 9.1 | 9.1 | 9.6 |
| PU A/silica sol E ratio | ∞ | 3/1 | 2/1 | 1/1 |
| Mean particle size | 151 nm | 194 nm | 194 nm | 195 nm |
| Modulus of elasticity (100%) | 2.2 MPa | 3.6 MPa | 4.3 MPa | 7.4 MPa |
| Ethyl acetate swelling | 295% | 187% | 163% | 120% |

The results stated in table 1 showed that, with increasing silica sol concentration, a substantially improved resistance to chemicals and improved mechanical properties result in comparison with the unmodified PU dispersion A (Impranil® DLN).

TABLE 2

Polyurethane B/silica sol mixtures comprising different silica sol types

|  | PU B | PU 4a | PU 5 | PU 6 | PU 7 |
|---|---|---|---|---|---|
| Solids content [% by weight] | 41.0 | 39.0 | 39.0 | 39.0 | 38.9 |
| pH | 6.9 | 9.0 | 8.4 | 9.3 | 9.1 |
| Silica sol type | — | Levasil® 100/30 | Levasil® 200/30 | Levasil® 300/30 | Levasil® VP AC 4038 |
| PU/silica sol ratio | — | 4/1 | 4/1 | 4/1 | 4/1 |
| Modulus of elasticity | 3.4 MPa | 3.2 MPa | 3.7 MPa | 5.4 MPa | 3.7 MPa |
| Ethyl acetate swelling | 310% | 295% | 266% | 295% | 295% |

The results in table 2 showed that a large number of silica sol types can be used.

TABLE 3

Polyurethane C/silica sol mixtures having different silica sol contents

|  | PU C (35% strength) | PU 8 | PU 9 | PU 10 | PU 11 |
|---|---|---|---|---|---|
| Solids content [% by weight] | 35.0 | 34.0 | 35.0 | 34.1 | 35.2 |
| pH | 7.47 | 7.69 | 7.77 | 8.46 | 8.92 |
| PU C/silica sol E ratio | ∞ | 4/1 | 3/1 | 2/1 | 1/1 |
| Mean particle size | 148.3 | 151.1 | 197.4 | 207.6 | 199.4 |
| Modulus of elasticity (100%) | 0.9 | 1.6 | 1.9 | 2.3 | 4.4 |
| Ethyl acetate swelling | 120% | 73% | 78% | 48% | 48% |

The results stated in table 3 showed that, with increasing silica sol concentration, substantially improved resistance to chemicals and improved mechanical properties result in comparison with the unmodified PU dispersion C (Impranil® DLP).

TABLE 4

Water vapor-permeabilities of silica sol-modified PU dispersions

| PU dispersion | PU/silica sol ratio | WVP [g/m²d] |
|---|---|---|
| PU A | ∞ | 1100 |
| PU 4b | 4/1 | 14690 |
| PU 1 | 3/1 | 14210 |
| PU D | ∞ | 1120 |
| PU 15 | 2/1 | 18000 |

The results in table 4 showed that, by using the silica sol-modified PU dispersions according to the invention, very much higher water vapor permeabilities (factor of 14–18) are achieved in comparison with the unmodified dispersions (PU A and PU D).

Leather

A) Leather Finishing

A1) Top Coat Test

Unfinished cattle hide upholstery nappa leather according to the following formulation was bottomed for the top coat test.

The leather was first bottomed with a formation of 330 parts of the adhesion-promoting bottom I with 100 parts of isopropanol and 600 parts of water (spray crosswise).

For bottoming, a mixture of 75 parts of the color J, 75 parts of the drying leveling agent K, 50 parts of the antiadhesion agent L, 150 parts of the acrylate dispersion M, 150 parts of the PU dispersion N and 475 parts of water is prepared. This mixture is sprayed twice (crosswise each time) onto the-bottomed leather. Drying is effected for 5 min at 70° C. The leather is hydraulically plated (80° C., 200 bar, 6 sec) and a further spray coat of the above mixture (crosswise) is then applied. After drying, plating is carried out again (80° C., 50 bar, kiss plate).

For the production of test specimens, top coats are applied to the leathers bottomed in this manner.

The top coat formulations were 12% strength in (silica sol-modified) PU (dry substance) and contained 2.2% of crosslinking agent P. The reference used was a 2:1 mixture of polyurethane Q with the product used for the preparation of the silica sol-modified types, and the corresponding pure product. Before being sprayed on, the formulations were brought to an efflux viscosity (DIN cup, 4 mm) of 19 sec using a commercial thickener.

The formulations were sprayed onto the bottomed leather in an amount of 5 g per ¼ square foot. Thereafter, the leathers were dried for 5 min at 80° C. and hydraulically plated (80° C., 200 bar, 3 sec).

The test specimens were tested for crock fastness and flexing endurance.

TABLE 5

(Leather finishing):
Silica sol-modified PU dispersions as top coat binders on upholstery leather, crosslinked with crosslinking agent P

| Binder | Wet rubs | Dry flexes | Wet flexes |
| --- | --- | --- | --- |
| PU Q/PU D (2/1) | 600/x | 100,000/xx | 20,000/o |
| PU D | 40/xx* | 100,000/o | 20,000/o |
| PU 15 | 530/x | 100,000/o | 20,000/o |
| PU 16 | 560/x–xx | 100,000/o | 20,000/o |

*Owing to the lumpiness of the film, the standard test felt cannot be held in the guide of the crock fastness tester (Bally finish tester) during the test.
Legend:
In the case of all flexes and rubs, the number before the slash indicates the number of flexes and rubs, respectively; the symbol after the slash is a rating of the damage to the coating: o = undamaged, x = slight damage, xx = moderate damage, xxx = severe damage The results stated in table 5 show that the lumpiness typical of PU is absent in the case of the binders according to the invention, in contrast to the pure PU D, without losing physical fastnesses. In the area of dry flexing, the dispersions according to the invention are in fact clearly superior to the prior art (PU Q/PU D (2/1)) in the property level.

A2) Bottomings with Silica Sol-Modified PU

Aqueous formulations are prepared, containing: X % silica sol-modified PU; 5% of colour J; 5% of matting composition Q; 5% of leveling agent K.

The amount X % of the modified PU used is such that the formulations are 12% strength in dry substance, based on this PU. The reference used is a bottom containing unmodified PU.

These formulations are brought to an efflux viscosity (DIN cup; 4 mm nozzle) of 16 sec using a commercial associative thickener. The formulations are sprayed once onto unfinished cattle hide upholstery nappa leather (10 ml per ½ square foot) and dried for 5 min at 80° C. Plating takes places (Rotopress, 90° C., 6 m/min) and the same formulations are sprayed twice more (with intermediate drying).

The leathers bottomed in this manner are tested for cold flexing endurance.

TABLE 6

(Leather finishing):
Cold flexing results of silica sol-modified PU dispersions as bottoming binders on leather

| | Cold flexes (10,000) | |
| --- | --- | --- |
| Binder | Bottom (−10° C.) | Bottom (−25° C.) |
| PU D | o | o |
| PU 12 | o | o |
| PU 17 | o | o |
| PU 13 | o | o |
| PU 14 | o | o |
| PU 15 | xx | xx |
| PU 16 | xx | xx–xxx |

Legend:
o = undamaged, x = slight damage, xx = moderate damage, xxx = severe damage The cold flexing results stated in table 6 showed that, even with a high content of added silica sol (PU 14), silica sol-modified PU dispersions are suitable as a bottom and are identical to the PU D also tested for comparison under identical application conditions and representing the prior art.

B) Leather Coating
  B1) Leather Coating (LEVACAST)
  Production of the Coating:
  1) General Procedure:
    In a film-drawing apparatus consisting of two polished rolls which can be adjusted to an exact spacing, a release paper is inserted before the rear roll. The distance between paper and front roll is adjusted by means of a feeler gage. This distance corresponds to the (wet) film thickness of the resulting coating and can be adjusted to the desired thickness of each coat. Coating is also possible consecutively in a plurality of coats.
    For application of the individual coats, the products (aqueous formulations are brought to a viscosity of 4 500 mPa s beforehand by adding ammonia/polyacrylic acid) are poured onto the gap between paper and front roll and the release paper is drawn perpendicularly downward, the corresponding film forming on the paper. If it is intended to apply a plurality of coats, each individual coat is dried and the paper inserted again.
  2) Production of a LEVACAST Coat and Adhesion to Leather:
    The binder is thoroughly mixed with the curing agent for 30 sec in a beaker. The binder/curing agent ratios are calculated from the chosen NCO equivalents (binder)/amine equivalents (curing agent) ratio in combination with the number of equivalents stated for these components. The mixture is poured onto the gap between paper and front roll (for viscosity reasons, it does not drip through). The paper is immediately drawn perpendicularly downward through the roll nip, the corresponding film forming on the paper. The leather (short-fiber chrome split) is placed on this film in the still tacky state and laminated manually using a rubber roller with moderate pressure. The sample is then dried in a forced-circulation drying oven for 5 min at 80° C. It is cooled to room temperature and the release paper is removed. The coated splits obtained in this manner are tested for flexing endurance (DIN 53351=EN 13334) and water vapor permeability (DIN 53333=EN 12991).
    The following parameters were chosen throughout for the production of the coated leathers according to this method:
    Binder equivalents/curing agent equivalent ratio=1.08/1; film thickness (wet): 0.2 mm. These parameters virtually correspond to those customary under production conditions.

Coating Experiments a) Reference; Pure LEVACAST Coating:

As described above under 2), binder R was mixed with curing agent S and a film was produced on the release medium. The film was bonded to leather (short-fiber chrome split); after drying, the coated leather was removed from the release medium.

b) LEVACAST Coatings with PU Top Coats:

Top coats were produced as described above under 1. The nip was chosen so that a solids coat of 25 g per square meter resulted (0.07 mm at 40% solids content). The top coats were dried. The following were used as top coats:

b1) 8:2 mixture of PU dispersion Q and D (customary top coat);
b2) pure PU dispersion D as comparison with b3, unsuitable as such owing to extremely lumpy handle;
b3) PU 15

Thereafter, papers coated with the top coats were inserted again and coated with LEVACAST as described under a) and adhesively bonded to leather. The test specimens thus obtained were tested for flexing endurances and water vapor permeability (table 7).

TABLE 7

(Leather coating)
Comparison of LEVACAST-coated leathers with various top coats

|  | Dry flexes | Wet flexes | Flexes at −10° C. | WVP |
|---|---|---|---|---|
| No top coat | 100 000/o | 20 000/o | 20 000/o | 1.6 |
| Top coat b1 | 80 000/o−x | 20 000/o | 20 000/o−x | 0.6 |
| Top coat b2 | 100 000/o | 20 000/o | 20 000/o | 0.8 |
| Top coat b3 | 90 000/o−x | 20 000/o | 20 000/o | 1.4 |

Top coat b3 gives a friction-free handle which corresponds to that of the top coat b1 usually used.

The WVP numbers are in mg/cm$^2$h.

What is claimed is:

1. An aqueous, silica sol-modified polyurethane dispersion consisting of a mixture of
   A) 40–95% of at least one non-alkoxysilane-modified polyurethane dispersion and
   B) 5–60% of at least one silica sol dispersion,
   wherein the stated percentages are based on the weight of nonvolatile fractions and wherein A) and B) add up to 100%, based on the total weight of A) and B), and
   C) one or more additives selected from the group consisting of nonionic thickeners, anionic thickeners, fillers, pigments, waxes, handle compositions, dyes, solvents, leveling agents, and combinations thereof.

2. The aqueous, silica sol-modified polyurethane dispersion of claim 1, wherein the silica sol dispersion has a solids content within the range of from 20 to 40 Wt. %, based on the total weight of the silica sol dispersion.

3. The aqueous, silica sol-modified polyurethane dispersion of claim 1, wherein the silica sol dispersion has a solids content within the range of from 25 to 35 wt. %, based on the total weight of the silica sol dispersion.

4. An aqueous, silica sol-modified polyurethane dispersion consisting of a mixture of:
   A) 50–90% of at least one non-alkoxysilane-modified polyurethane dispersion and
   B) 10–50% of a silica sol dispersion;
   wherein the stated percentages are based on the weight of nonvolatile fractions and wherein A) and B) add up to 100%, based on the total weight of A) and B), and
   C) one or more additives selected from the group consisting of nonionic thickeners, anionic thickeners, fillers, pigments, waxes, handle compositions, dyes, solvents, leveling agents, and combinations thereof.

5. The aqueous, silica sol-modified polyurethane dispersion of claim 4, wherein the silica sol dispersion has a solids content within the range of from 20 to 40 wt. %, based on the total weight at the silica sol dispersion.

6. The aqueous, silica sol-modified polyurethane dispersion of claim 4, wherein the silica sol dispersion has a solids content within the range of from 25 to 35 wt. %, based on the total weight of the silica sol dispersion.

7. An aqueous, silica sol-modified polyurethane dispersion consisting of a mixture of:
   A) 60–85% of at least one non-alkoxysilane-modified polyurethane dispersion and
   B) 15–40% of a silica sol dispersion;
   wherein the stated percentages are based on the weight of nonvolatile fractions and wherein A) and B) add up to 100%, based on the total weight of A) and B), and optionally
   C) one or more additives selected from the group consisting of nonionic thickeners, anionic thickeners, fillers, pigments, waxes, handle compositions, dyes, solvents, leveling agents, and combinations thereof.

8. The aqueous, silica sol-modified polyurethane dispersion of claim 7, wherein the silica sol dispersion has a solids content within the range of from 20 to 40 wt. %, based on the total weight of the silica sol dispersion.

9. The aqueous, silica sol-modified polyurethane dispersion of claim 7, wherein the silica sol dispersion has a solids content within the range of from 25 to 35 wt. %, based on the total weight of the silica sol dispersion.

* * * * *